United States Patent [19]
Herr, Jr.

[11] 3,949,823
[45] Apr. 13, 1976

[54] LOCK-OUT DEVICE FOR FINAL DRIVE OF A TRACK-TYPE VEHICLE

[75] Inventor: Charles H. Herr, Jr., Peoria, Ill.

[73] Assignee: Caterpillar Tractor Co., Peoria, Ill.

[22] Filed: Apr. 9, 1975

[21] Appl. No.: 566,541

[52] U.S. Cl. .................................. 180/9.62; 74/405
[51] Int. Cl.² .......................................... B60K 17/10
[58] Field of Search ......... 74/405; 180/9.62, 66, 70, 180/44 M, 44 F, 44 E, 93 A, 94, 97

[56] References Cited
UNITED STATES PATENTS

| | | | |
|---|---|---|---|
| 3,504,564 | 4/1970 | Kell | 74/405 |
| 3,800,901 | 4/1974 | Blomstrom | 180/9.62 |

Primary Examiner—Philip Goodman
Attorney, Agent, or Firm—Phillips, Moore, Weissenberger, Lempio & Strabala

[57] ABSTRACT

A final drive for track-type vehicles includes a power train comprising a pair of drive shafts normally coupled together to transmit power therebetween. A lock-out device is provided to lock one of the drive shafts to a housing of the final drive when such drive shaft is moved axially to uncouple it from the other drive shaft.

15 Claims, 5 Drawing Figures

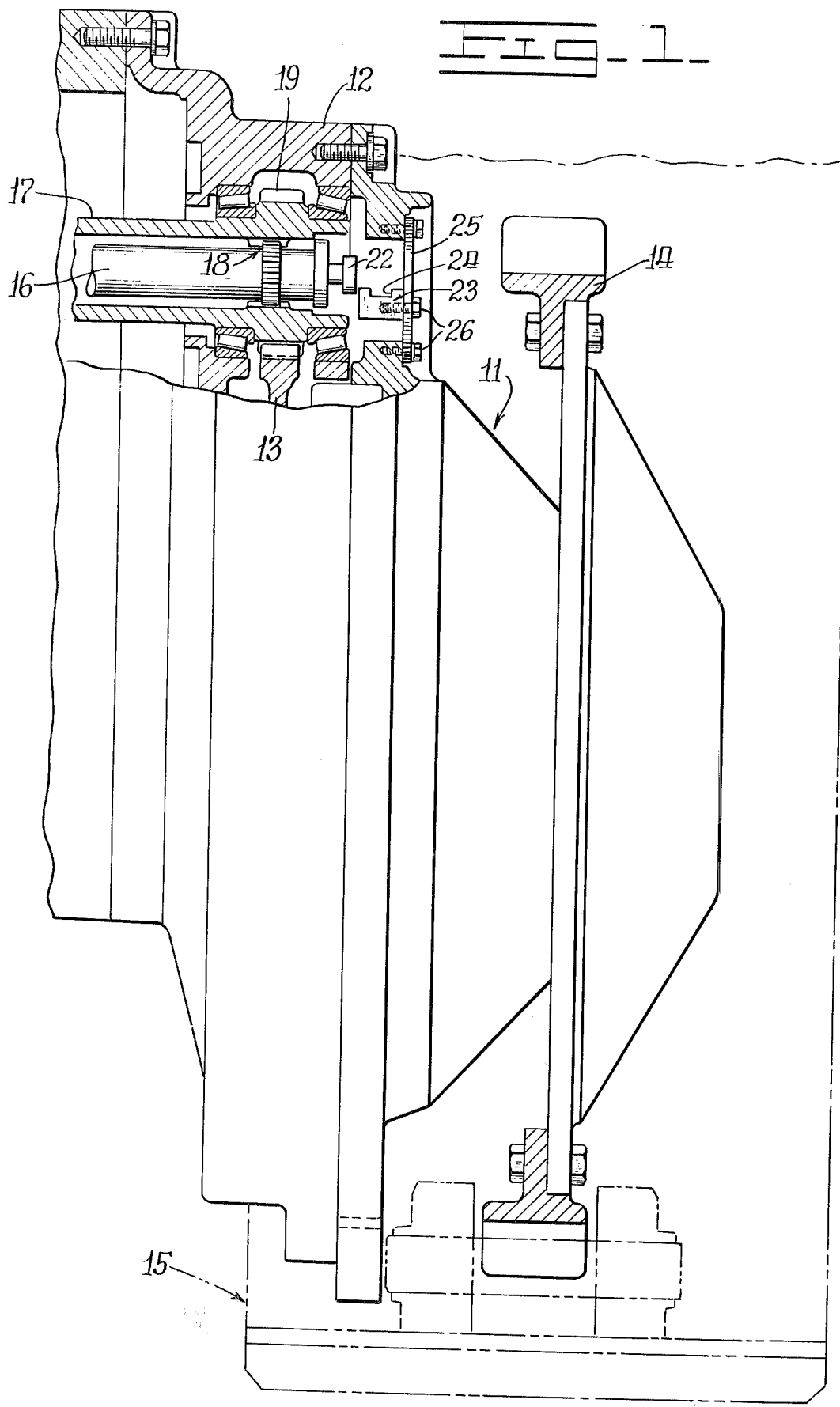

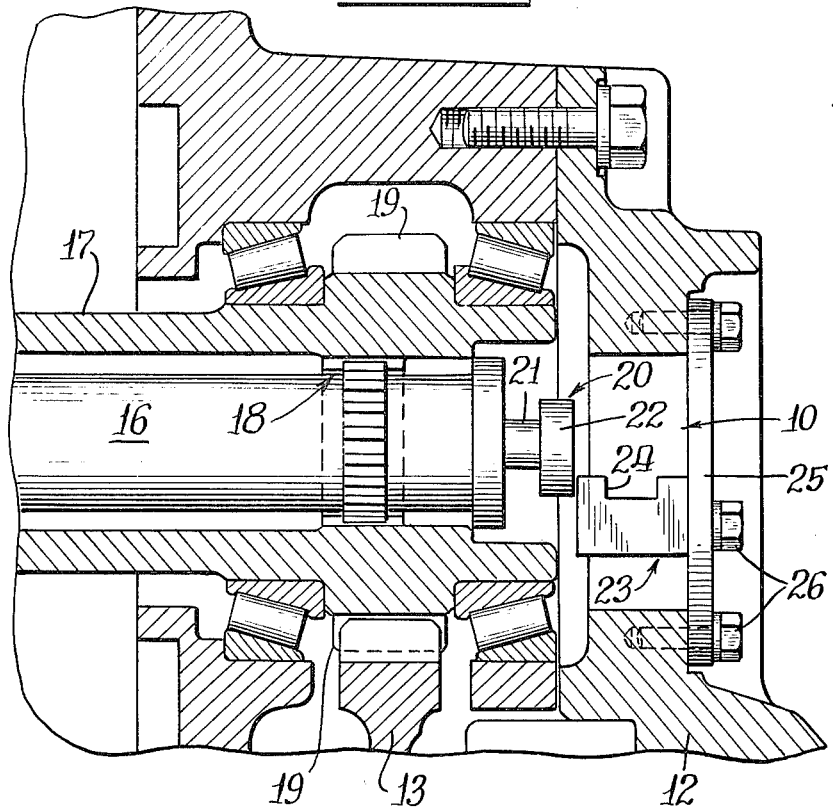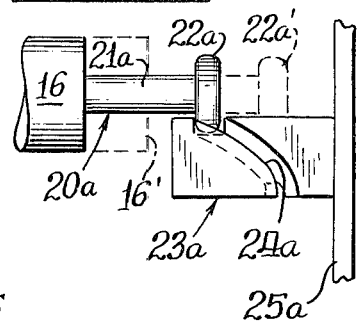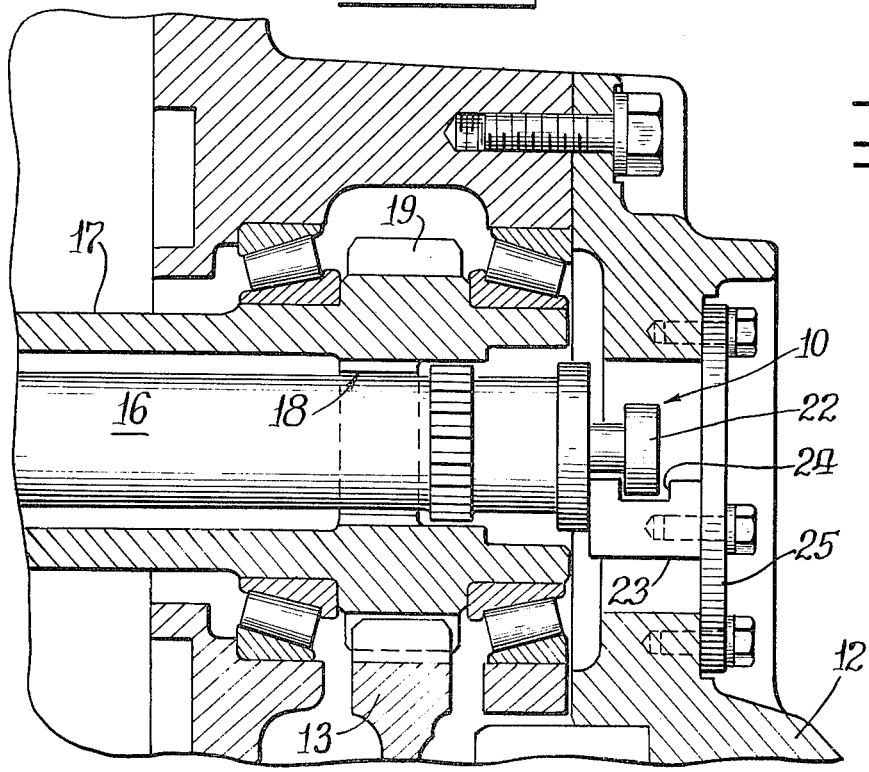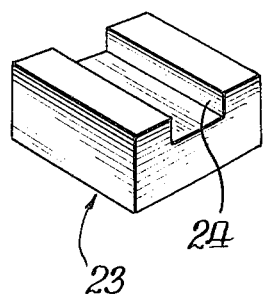

LOCK-OUT DEVICE FOR FINAL DRIVE OF A TRACK-TYPE VEHICLE

BACKGROUND OF THE INVENTION

It is oftentimes desirable to disconnect a final drive for a track-type vehicle, such as an excavator, when the vehicle is being towed. Although the transmission for the vehicle is normally placed in neutral during such towing, hydrostatic motors employed in the vehicle's final drive remain operatively connected to the drive sprockets for the tracks. Thus, the motors are driven by the sprockets during towing which may result in damage thereto due to lubricant starvation and frictional drag occasioned between the rotating components thereof.

In addition, a normally engaged and hydraulically releasable brake is usually integrated into the final drive. Since the vehicle's power plant is non-operative during such towing, the barke cannot be released hydraulically unless special release mechanisms are employed therefor.

Typical lock-out devices for disengaging a pair of meshing gears employed in such a final drive are disclosed in U.S. Pat. Nos. 3,744,331, 3,800,901 and 3,835,722, as well as U.S. Pat. application Ser. No. 311,823, filed on Dec. 4, 1972 by Cheek et al for "Drive Disconnect Device". The above patents and application are all assigned to the assignee of this application.

SUMMARY OF THIS INVENTION

An object of this invention is to overcome the above, briefly described problems by providing an economical and non-complex lock-out device for selectively maintaining a rotary drive member of a power train in a disengaged position relative to a normally coupled driven member. The lock-out device comprises first and second locking means secured to the driving member and to a stationary housing, respectively. In the preferred embodiment of this invention, such members comprise a pair of normally coupled drive shafts included in the final drive for a track-type vehicle.

BRIEF DESCRIPTION OF THE DRAWINGS

Other objects of this invention will become apparent from the following description and accompanying drawings wherein:

FIG. 1 is a partially sectioned, elevational view of a power train comprising a final drive for a track-type vehicle;

FIG. 2 is an enlargement of the sectioned portion of FIG. 1, illustrating a lock-out device of this invention in its unattached condition;

FIG. 3 is a view similar to FIG. 2, but illustrates the lock-out device in its attached condition;

FIG. 4 is an isometric view of a locking member employed in the locking device; and FIG. 5 is a side elevational view of a modified locking device.

DETAILED DESCRIPTION

FIG. 1 illustrates a lock-out device 10 operatively associated with a final drive 11 employed in a power train for a track-type vehicle. The final drive, duplicated on the opposite side of the vehicle, is disposed within a multi-part stationary housing 12, detachably secured to a track roller frame (not shown) of an undercarriage of the vehicle. The final drive comprises a first spur gear 13 secured to an output shaft of a suitably constructed and arranged gear train.

A drive sprocket 14 is secured to an end of the output shaft to engage and move an endless track assembly 15 in a conventional manner. A hydrostatic motor and a normally engaged brake assembly (not shown) are normally attached together in axial alignment on the inboard side of housing 12. Such motor and brake assembly may be of the type disclosed in U.S. Pat. No. 3,771,627, assigned to the assignee of this application.

The motor may be selectively actuated to supply input power to final drive 11 upon rotation of its output drive shaft 16 and a drive shaft 17, constituting rotary driving and driven members, respectively. The shafts are coupled together at a "loose" spline connection or coupling 18 for selectively permitting shaft 16 to be moved axially relative to shaft 17. A second spur gear 19 is formed integrally on drive shaft 17 and normally meshes with first spur gear 13 in parallel axis relationship.

Referring to FIG. 2, lock-out device 10 comprises first locking means in the form of a first locking member 20 secured on an end of sahft 16. The locking member constitutes a post 21 having an enlarged annular head 22 secured thereon. A second locking means comprises a second locking member 23 having a transverse groove 24 defined therein which is suitably sized to receive locking member 20 therein when shaft 16 is moved rightwardly to its FIG. 3, disengaged position.

As shown in FIG. 4, groove 24 is straight and has a rectangular cross section throughout its entire length. Member 23 is welded or otherwise suitably secured internally on an annular cover plate 25. The cover plate is releasably attached to housing 12 by a plurality of circumferentially disposed cap screws or fastening means 26, exposed externally on the housing for removal purposes.

During vehicle operation, drive shaft 16 is positioned as shown in FIG. 1 to continuously maintain its driving connection with shaft 17 at coupling 18. The hydrostatic motor will thus function to selectively drive shaft 16 which, in turn, drives the final drive to impart rotary motion to sprocket 14 for propelling the vehicle via endless track assembly 15. As shown in FIG. 3, when the vehicle is towed to a service facility, for example, cover plate 25 is removed and drive shaft 16 is shifted rightwardly to its disengaged position to uncouple shafts 16 and 17 at coupling 18. Such disengagement interrupts the drive train to prevent final drive 11 from imparting rotation to the hydraulic motor and intermediate drive mechanisms. Drive shaft 16 is locked in its FIG. 3 position by reinstalling plate 25 so that groove 24 of member 23 engages member 20 to prevent axial movement of the drive shaft.

FIG. 5 illustrates a modified lock-out device 10 comprising a first locking member 20a engaged with a cylindrical second locking member 23a. In particular, the first locking member comprises an elongated post 21a secured to drive shaft 16 and having an annular head 22a formed thereon to engage a spiral groove 24a formed on the second locking member. If so desired, the head and groove may be constantly engaged, both during operation of the vehicle and towing thereof to a remote location.

Locking member 23a is welded or otherwise suitably secured to an annular cover plate 25a which also may be suitably attached to housing 12 by a plurality of cap screws. Alternatively, the circumferential periphery of the cover plate may be mounted on the housing as a semi-permanent part thereof by a suitably constructed and arranged tongue and groove arrangement. In either case, drive shaft 16 would be moved rightwardly to its phantom-line, locked position 16' to disengage drive shafts 16 and 17 at coupling 18 (FIG. 3), simply by releasing and rotating cover plate 25 in the proper direction. Head 22a and groove 24a are suitably sized and constructed to permit the head to be tracked and moved rightwardly in the groove to facilitate towing of the vehicle.

I claim:

1. In a power train comprising a rotary driving member disposed for rotation about a longitudinal axis thereof and reciprocally mounted in a stationary housing for axial movement between a normally engaged position with respect to a rotary driven member to transmit power therebetween and a disengaged position relative to said driven member, the invention comprising
    a lock-out device for selectively maintaining said driving member in said disengaged position including
    first locking means secured to said driving member and
    second locking means secured to said housing and normally disposed in close proximity to said first locking means when said driving member is maintained in its engaged position and attachable to said first locking means when said driving member is moved to its disengaged position, said second locking means being secured internally on a cover plate releasably secured to said housing by fastening means exposed externally of said housing.

2. The power train of claim 1 wherein said driving and driven members comprise first and second shafts, respectively, normally coupled together for simultaneous rotation.

3. The power train of claim 2 wherein said shafts are coupled together by a spline connection and have rotational axes which are at least substantially co-incident.

4. The power train of claim 1 wherein said first locking means comprises a first locking member secured on an axial end of said driving member.

5. The power train of claim 4 wherein said first locking member constitutes a post having an enlarged annular head secured thereon.

6. The power train of claim 4 wherein said second locking means constitutes a second locking member and means defining a groove in said second locking member adapted to receive said locking member therein when said driving member is moved in its disengaged position.

7. The power train of claim 6 wherein said groove is disposed transversely relative to said longitudinal axis.

8. The power train of claim 7 wherein said groove is straight and has a rectangular cross section throughout its entire length.

9. The power train of claim 7 wherein said groove is spiralled on said second locking member.

10. The power train of claim 2 wherein said power train comprises a final drive of a vehicle.

11. In a power train comprising a rotary driving member disposed for rotation about a longitudinal axis thereof and reciprocally mounted in a stationary housing for axial movement between a normally engaged position with respect to a rotary driven member to transmit power therebetween and a disengaged position relative to said driven member, the invention comprising
    a lock-out device for selectively maintaining said driving member in said disengaged position including
    a first locking member constituting a post secured on an axial end of said driving member and an enlarged annular head secured on said post, and
    a second locking member, defining a groove therein, secured to said housing and normally disposed in close proximity to said locking member when said driving member is maintained in its engaged position and attachable to said first locking member when said driving member is moved to its disengaged position by engaging said head within said groove.

12. In combination with a power train constituting a final drive of a vehicle, said power train comprising a first shaft disposed for rotation about a longitudinal axis thereof and reciprocally mounted in a stationary housing for axial movement between a normally engaged position coupling said first shaft to a rotary second shaft to transmit power therebetween and a disengaged position relative to said second shaft, a lock-out device for selectively maintaining said first shaft in said disengaged position including first locking means secured to said first shaft and second locking means secured to said housing and normally disposed in close proximity to said first locking means when said first shaft is maintained in its engaged position and attachable to said first locking means when said first shaft is moved to its disengaged position relative to said second shaft.

13. The power train of claim 12 wherein said vehicle comprises an endless track and a sprocket drivingly engaged with said track and operatively connected in said final drive to be driven thereby.

14. The power train of claim 13 wherein said first shaft constitutes an output shaft of a hydrostatic motor and is coupled within said second shaft.

15. The power train of claim 14 further comprising a first spur gear operatively connected to said sprocket to drive the same and a second spur gear on said second shaft and meshing with said first spur gear.

* * * * *